(12) United States Patent
Pottie et al.

(10) Patent No.: US 8,453,943 B2
(45) Date of Patent: Jun. 4, 2013

(54) HEATING CARTRIDGE FOR THERMOSTATIC ELEMENT AND METHOD FOR MANUFACTURING SAME, AS WELL AS THERMOSTATIC VALVE COMPRISING SUCH A CARTRIDGE

(75) Inventors: Nicolas Pottie, Sainte Genevieve des Bois (FR); Thierry Maraux, Les Clayes Sous Bois (FR)

(73) Assignee: Vernet, Ollainville (FR)

( * ) Notice: Subject to any disclaimer, the term of this patent is extended or adjusted under 35 U.S.C. 154(b) by 707 days.

(21) Appl. No.: 12/719,998

(22) Filed: Mar. 9, 2010

(65) Prior Publication Data
US 2010/0230504 A1 Sep. 16, 2010

(30) Foreign Application Priority Data
Mar. 11, 2009 (FR) ...................................... 09 51523

(51) Int. Cl.
*G05D 23/02* (2006.01)
*G05D 23/08* (2006.01)
*H05B 3/08* (2006.01)
*H05B 3/10* (2006.01)

(52) U.S. Cl.
USPC ......... 236/93 A; 236/93 R; 219/541; 219/548

(58) Field of Classification Search
USPC . 236/93 A, 93 R; 219/541, 548, 552; 165/41; 123/41.08, 41.1
See application file for complete search history.

(56) References Cited

U.S. PATENT DOCUMENTS
8,217,319 B2 * 7/2012 Pottie et al. ................... 219/482

FOREIGN PATENT DOCUMENTS
DE 10303133 7/2004
FR 2853710 10/2004

* cited by examiner

*Primary Examiner* — Chen Wen Jiang
(74) *Attorney, Agent, or Firm* — Dowell & Dowell, PC

(57) ABSTRACT

This heating cartridge includes a thermally conductive tube (42) to be immersed in a thermo-expandable substance of the thermostatic element, electric heating means (6) arranged inside the tube, and a base (7) made of a plastic substance, integral with a terminal longitudinal portion (44) of the tube and adapted to support the electric connection between the heating means and an external current source. In order to make the connection between the base and the tube both resistant and precisely adaptable to various heating cartridge geometries, and to do so economically, the terminal portion of the tube comprises an outwardly flared free end (45), which extends protruding both radially and axially from the rest of the terminal portion and in which the base is attached by overmolding.

11 Claims, 3 Drawing Sheets

HEATING CARTRIDGE FOR THERMOSTATIC ELEMENT AND METHOD FOR MANUFACTURING SAME, AS WELL AS THERMOSTATIC VALVE COMPRISING SUCH A CARTRIDGE

BACKGROUND OF THE INVENTION

1. Field of the Invention

The present invention relates to a heating cartridge for a thermostatic element, as well as a method for manufacturing such a cartridge. It also relates to a thermostatic valve including such a cartridge.

2. Brief Description of the Related Art

In many applications of the fluidics field, in particular for cooling of thermal engines of vehicles, thermostatic valves are used to distribute a fluid entering into different circulation channels, depending on the temperature of that fluid. These valves are called thermostatic in the sense that the movement of their internal plug(s) is controlled by a thermostatic element, i.e. an element which comprises a cup containing a thermo-expandable substance and a piston which is slidingly displaceable with respect to the cup under the action of the thermo-expandable substance during the expansion thereof.

In order to distribute the fluid depending on other parameters, in particular conditions outside the valve such as the ambient temperature or the load of the vehicle propelled by the engine equipped with the valve, it is known to integrate an electric cartridge into the valve to heat the thermo-expandable substance, which makes it possible to steer the valve from the outside thereof, independently or as a complement to the temperature of the entering fluid, in particular using a computer onboard the vehicle and programmed appropriately. In practice, the heating cartridge comprises electric heating means, such as a heating resistor, arranged inside the aforementioned piston or a similar tube: by immobilizing, for example, the piston at the external case of the valve, the electrical supply of the resistor causes an increase in temperature of the thermo-expandable substance, which causes, through expansion of the latter part, the sliding of the cup around the piston, a plug being supported by said cup to act on the circulation of the fluid through the valve.

In order to electrically supply the heating means, the cartridge comprises connectors to electrically connect electric conduction wires, belonging to the heating means, and charge ports connected to an external current source. These connectors are supported by a base integral with the tube, this base thus undergoing, at least in part, the strains absorbed by the piston during use.

In this context, DE-A-103 03 133 proposed to strengthen the mechanical resistance of the connection between the base and the tube, by realizing the base through molding of a plastic substance injected on either side of a flat clamping plate, provided at the end of the tube in a radial plane at said tube end. This radical solution has proven difficult to carry out in practice, inasmuch as it requires having injection molds adapted, simultaneously, to each possible shape and size for the tube and the total axial dimension that one wishes to obtain for the heating cartridge. The molding cost to meet the different geometries of heating cartridges therefore becomes crippling.

SUMMARY OF THE INVENTION

The aim of the present invention is to propose a heating cartridge whereof the connection between its tube and its base is both resistant and precisely adaptable to various geometries of heating cartridges, all while being economical to carry out.

To that end, the object of the invention is a heating cartridge for a thermostatic element, including:
- a thermally conductive tube, having a longitudinal central axis and adapted to be immersible in a thermo-expandable substance of the thermostatic element,
- electric heating means arranged inside the tube, and
- a base made of a plastic substance, integral with a terminal longitudinal portion of the tube and adapted to support the electric connection between the heating means and an external current source, characterized in that the terminal portion of the tube comprises an outwardly flared free end, which extends protruding both radially and axially from the rest of the terminal portion and in which the base is attached by overmolding.

The basic idea of the invention is not to try to realize the base by coating the entire terminal portion of the tube with plastic, which makes the base massive and not very precise, but to overmold the inside of the free end of the tube, flared specifically. To do this, said flared end presents an overmold face, turned opposite the rest of the tube, including components which are both radial and axial in relation to the axis of the tube: the radial component of the overmold interface between the tube and the base allows good transmission of axial strains, which avoids, during use, the tube damaging the base, in particular by shearing it, while the axial component of this interface makes it possible, on one hand, to improve the transverse positioning of the base, in particular by facilitating the placement of injection molds of the plastic substance of the base, and, on the other hand, to absorb transverse strains.

It is then advantageously possible to overmold the base by only making it extend axially from a single axial side of the terminal portion of the tube including the flared end. The flared end of the tube can thus serve as a reliable and precise reference to impose the axial dimension of the base during its molding, with a corresponding injection mold adjustment. In other words, it is the molding tool which gives the heating cartridge its effective functional length, by precisely controlling the measurement between the end of the heating cartridge and the axial face opposite the base, which avoids providing attached adjustment means, such as adjustment systems through screws, added wedges, etc.

Advantageously, a heating cartridge according to the invention also includes a gasket, preferably only one, which simultaneously surrounds the flared free end of the tube and is inserted between this flared free end and the base. This gasket which, in particular, is a shape gasket, makes it possible to simultaneously seal the inside of the tube and the electric connection supported by the base. Moreover, the closing of the injection mold of the base can be done on the gasket, which makes it possible to accommodate the dispersions of the total axial length of the heating cartridge.

According to other advantageous features of the heating cartridge according to the invention, taken alone or according to all technically possible combinations:
- the flared free end includes an annular flange, essentially centered on the axis of the tube, and a wall bent at angles transversely connecting the flange to the rest of the terminal portion;
- the gasket includes an annular body defining a groove configured to receive the flange in a complementary manner;
- the bent wall is at least partially inscribed in a plane perpendicular to the axis of the tube.

Another object of the invention is a thermostatic valve, including:
- a heating cartridge as defined above,
- a case, in which a fluid circulates and which defines, inside, a blind cavity in which the base of the heating cartridge is housed and bears axially,
- a plug for regulating the flow of the fluid through the case, and
- a thermostatic element, comprising a fixed portion, fixedly connected to the case, and a mobile portion, which supports the plug and which can be moved in relation to the fixed portion under the action of the expansion of a thermo-expandable substance in which the tube of the heating cartridge is immersed.

Another object of the invention is a method for manufacturing a heating cartridge for a thermostatic element, in which one has a thermally conductive tube, which has a longitudinal central axis, which is adapted to be immersed in a thermo-expandable substance of the thermostatic element and in which electric heating means are arranged,
characterized in that one configures a terminal longitudinal portion of the tube so as to flare its free end outward so that said free end extends protruding both radially and axially from the rest of the terminal portion,
then one connects a base made of a plastic substance to the terminal portion, attaching it by overmolding in the flared free end, all while preparing it to support the electric connection between the heating means and an external current source.

The method according to the invention makes it possible to manufacture a heating cartridge as defined above.

According to advantageous features of this method:
- before attaching the base, one attaches a gasket around the flared free end, then one overmolds the base by partially coating this gasket to insert it between the base and the flared free end;
- in order to overmold the base, one injects plastic substance into a mold closed on the gasket.

BRIEF DESCRIPTION OF THE DRAWINGS

The invention will be better understood upon reading the description which follows, provided solely as an example and done in reference to the drawings in which:

FIG. 4 is a perspective view showing only certain components of the heating cartridge.

DESCRIPTION OF THE PREFERRED EMBODIMENT

Figure 1:
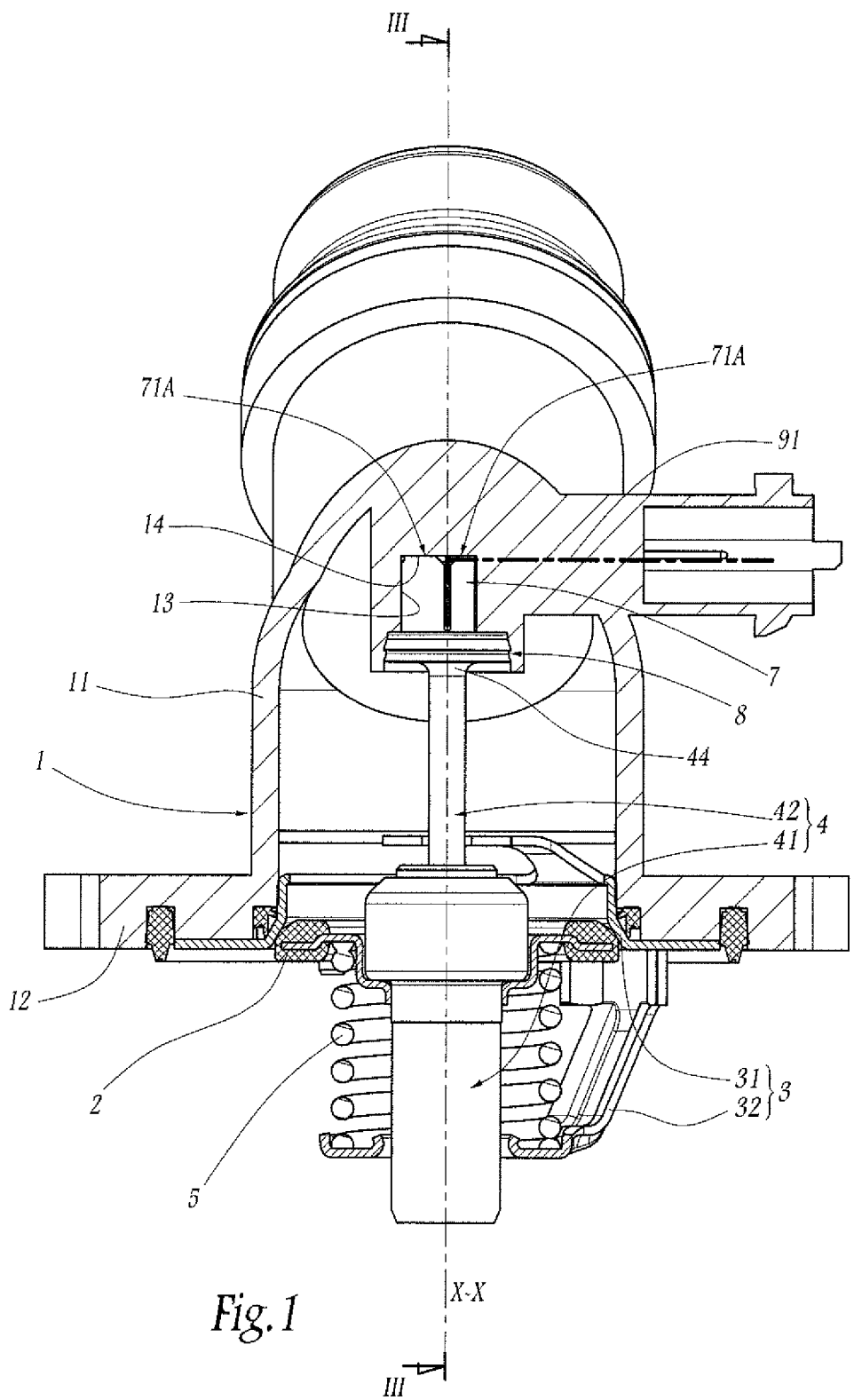
FIG. 1 is a longitudinal cross-sectional view of a thermostatic valve according to the invention.

FIG. 1 illustrates a thermostatic valve including a case 1 in which is designed to circulate, regulated by the other components of the valve, a fluid, in particular a coolant liquid when the valve belongs to a cooling circuit for a thermal engine. The case 1 comprises a tubular main body 11, here with a bent global shape, one portion of which extends in length centered around an axis X-X belonging to the cutting plane of FIG. 1. During use, the aforementioned fluid flows through the body 11, between its two longitudinal ends, while being regulated, here at the end of the portion of the body 11 centered on the axis X-X, by an isolating plug 2 centered on the axis X-X and which can be moved in translation along that axis: when said plug is pushed sealably against a seat 31 defined by a rigid armature 3 connected fixedly to a clamping plate 12 of the case 1, as illustrated in FIG. 1, the flow of the fluid is interrupted, whereas, when the isolating plug 2 is separated from the seat 31, the fluid can circulate freely around the isolating plug and thus enter or exit the body 11.

In practice, various embodiments can be considered concerning the case 1, the isolating plug 2 and the armature 3, without limiting the invention. Thus, for example, the portion 31 of the armature 3 can be absent, the bearing seat of the isolating plug 2 then being defined directly by the case 1.

To control the movement of the isolating plug 2, the thermostatic valve includes a thermostatic element 4 comprising, in a manner well known in the field, on one hand a cup 41, which contains a thermo-expandable substance, not visible in the figures, and around which the isolating plug 2 is fixedly connected, for example by pushing in, and on the other hand a piston 42, which is partially immersed in the cup 41 and which can be moved in translation along its central longitudinal axis under the action of the expansion of the thermo-expandable substance contained in said cup. The thermostatic element is arranged opposite the case 1 such that, on one hand, its piston 42 is centered on the axis X-X and, on the other hand, this piston is fixedly connected to the body 11, here at the bend of said body 11, as specified in more detail below. Thus, during use, the piston 42 is fixed in relation to the case 1, while the cup 41 and the isolating plug 2 it supports can be moved along the axis X-X in relation to the case, under the effect of the thermo-expandable substance when said substance expands, or indeed, when said substance contracts, under the opposite effect of a return spring 5 inserted between the isolating plug 2 and a U-bolt 32 integral with the case 1, here belonging to the armature 3.

Figure 2:
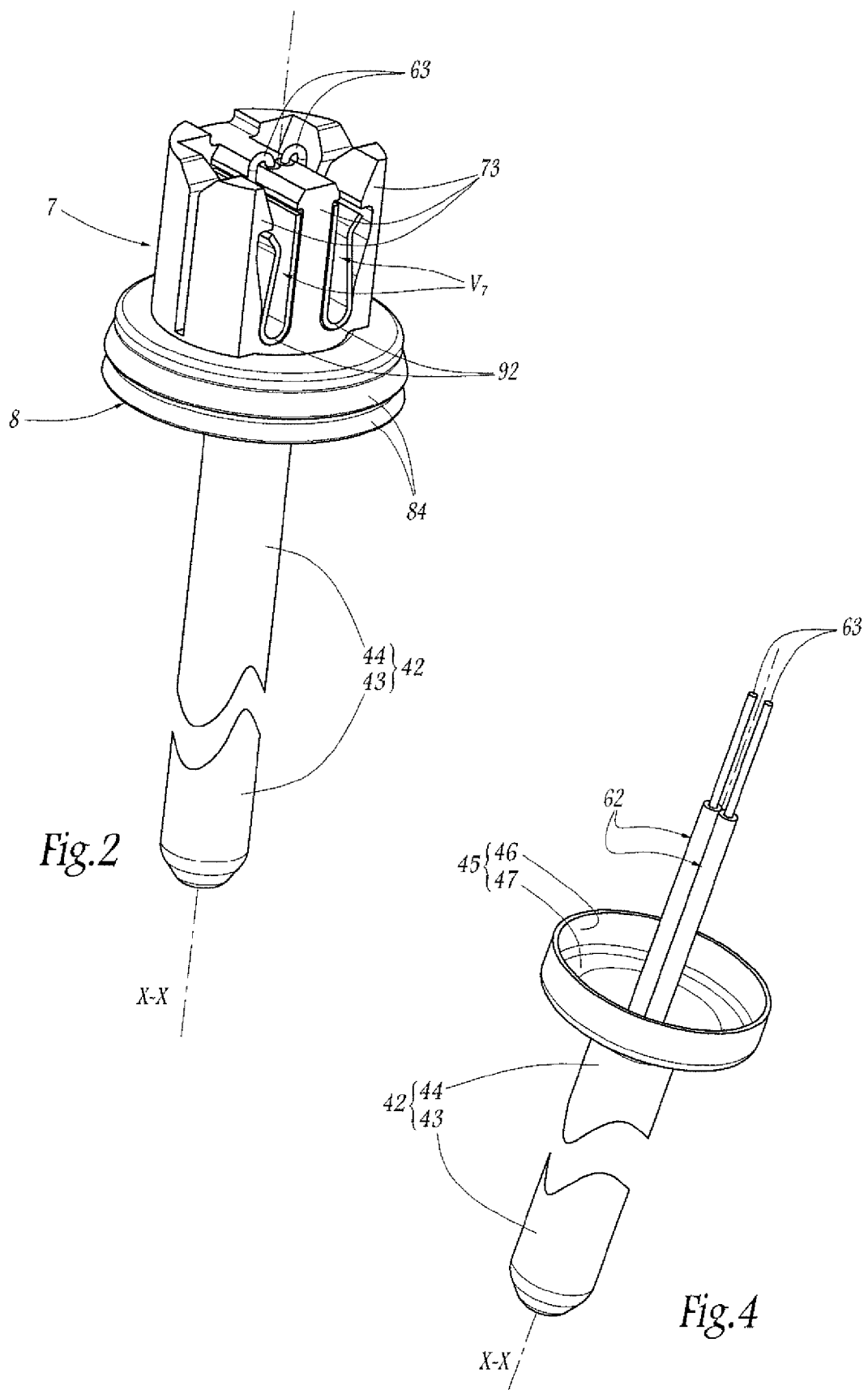
FIG. 2 is a perspective view of a heating cartridge belonging to the valve of FIG. 1.

The thermostatic valve also includes a heating cartridge, detailed below and illustrated alone in FIG. 2, having specified that, for convenience, the continuation of the description is oriented in relation to the axis X-X: the terms "lower" and "bottom" describe an axial direction oriented toward the cup 41 of the thermostatic element 4, while the terms "upper" and "top" describe an opposite direction.

Figure 3:
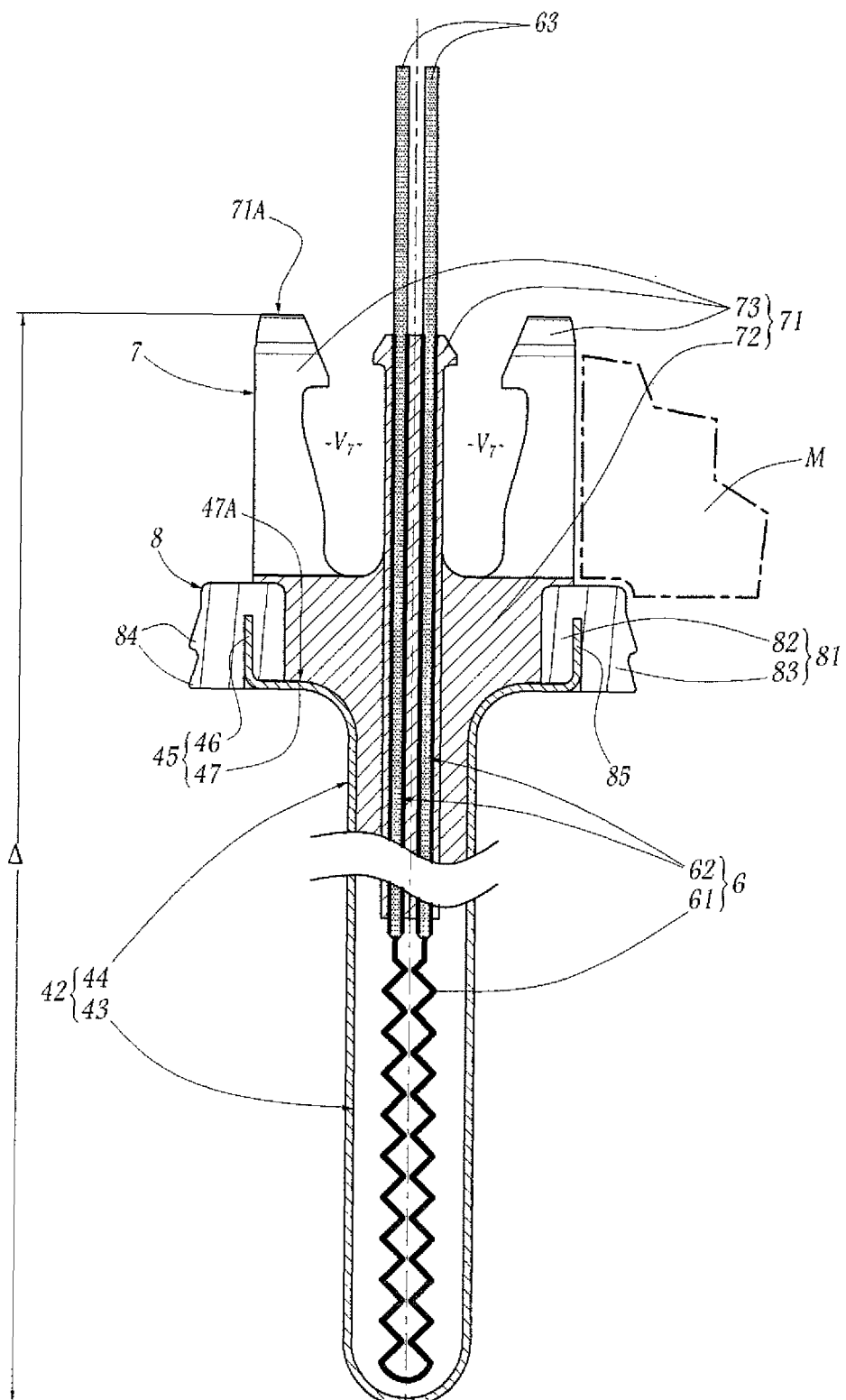
FIG. 3 is a cross-section along the plane of FIG. 1, showing only the heating cartridge during manufacturing.

The heating cartridge comprises an electric heating resistor 6 which, as visible in FIG. 3, is arranged inside the piston 42, realized to that end in the form of a metallic tube, here with a circular base, such that the main heating body 61 of this resistor occupies the lower terminal portion 43 of the piston 42, i.e. its terminal portion being immersed in the cup 41, so that the heating body 61 can heat the thermo-expandable substance contained in said cup.

In its upper terminal portion 44, the piston 42 is configured with a free end 45 flared outward: as visible in FIGS. 3 and 4, this flared end 45 is made up of an annular flange 46, centered on the axis X-X, and a bent wall 47, inscribed in a plane perpendicular to the axis X-X and thus radially connecting the lower end of the flange 46 to the upper end of the rest of the terminal portion 44. Advantageously, the flange 46 and the bent wall 47 are a single piece here with the rest of the terminal portion 44, obtained in particular by stamping of the free end 45.

The heating cartridge also comprises a base 7 made up of a plastic substance, integral with the terminal portion 44 of the piston 42, with insertion of a gasket 8. More precisely, the base 7 is made up of a body made of plastic substance 71 integrally connected to the terminal piston portion 44 by overmolding thereof, extending axially from a single axial side of said terminal piston portion 44: the base body 71 thus comprises a lower base 72 occupying the internal volume of the terminal piston portion 44, as well as upper walls 73 extending axially protruding upward from the base 72, as shown in FIG. 3.

The base 72 coats the inner peripheral portion 82 of the annular body 81 of the joint 8, while the outer peripheral portion 83 of the gasket body 81 protrudes radially outwardly in relation to the base body 71 and here presents peripheral sealing lips 84 on its outer side face. The body 81 of the gasket 8 is provided with a lower groove 85, which is hollowed upward from the lower face of the body 81, radially between its portions 82 and 83. This groove 85 is dimensioned to receive the flange 46 of the flared free end 45 of the piston 42 in a complementary manner, as shown in FIG. 3.

To manufacture the heating cartridge from the piston 42 shown in FIG. 4, in particular with its outwardly flared terminal portion 44 at its free end 45, one attaches the gasket 8 on the flared free end 45, slipping the flange 46 inside the groove 85. The portion 83 of the gasket body 81 then outwardly surrounds the flange 46 while the gasket portion 82 bears axially against a portion of the bent wall 47. One then places the piston 42, provided with the gasket 8, in a plastic substance injection mold M illustrated only partially and diagrammatically in the right portion of FIG. 3: this mold M is pressed sealably against the gasket portion 83 such that this mold is thus closed on the gasket 8. Plastic substance is then injected inside the mold, in order to mold the base 7 by overmolding of the terminal portion 44 of the piston 42: the plastic substance spreads inside this piston portion 44 and coats the gasket portion 82, thus forming the base 72 of the base body 71, while the walls 73 of the gasket body 71 are formed by extensions of plastic substance extending axially upward from the base 72.

The manufacture of the heating cartridge is completed by the realization of fittings in order to electrically connect the heating resistor 6 and an external current source. To do this, two electric conduction wires 62 coming from the main heating body 61 are provided to pass all the way through, along the direction of the axis X-X, the base body 71. In practice, before the overmolding of the base 7, the heating body 61 is placed inside the terminal portion 43 of the piston 42 such that the wires 62, which are connected to said heating body 61, or constitute the ends thereof, extend to the outside of the piston 42, passing through the terminal portion 44 from which they emerge upward while presenting respective free ends 63, as illustrated in FIG. 4. Then, during the realization of the base 7 by overmolding, the plastic substance injected to form the base body 71 coats the portions of the wires 62, situated at the piston portion 44, leaving the free ends 63 of said wires protruding, as illustrated in FIG. 3.

The ends 63 of the wires 62 are then folded downward, respectively inside free volumes $V_7$ defined by the base body 71 between its walls 73. These free volumes $V_7$, advantageously arranged during the molding of the base body 71, are dimensioned to receive ports 91, which are partially shown in dotted lines in FIG. 1 and which, during use, are powered by a current source, not shown, external to the heating cartridge and the thermostatic valve, as well as, advantageously, mechanical coupling pieces 92 (FIG. 2) between the wire ends 63 and these ports 91. In practice, the ports 91 can assume various forms, to which the free volumes $V_7$ are consequently adapted. In all cases, the ports 91 connect, through the case body 11, the outside of this body and the bottom of a blind cavity 13 defined inside by the case body 11. As shown in FIG. 1, this cavity 13 assumes an elongated form along the axis X-X, while being upwardly closed by a bottom wall 14 belonging to the case body 11, here at the bend thereof, while the cavity 13 is downwardly open, leading to the inside of the case body 11.

In the assembled configuration of the thermostatic valve, the flared free end 45 of the piston 42 is received inside the cavity 13, so as to house the base 7 and the gasket 8 therein, as illustrated in FIG. 1. More precisely, the outer profile of the transverse section of the base body 71, in particular at its upper walls 73, is adjusted on the inner profile of the transverse section of the cavity 13, with the result that this base body 71 is housed in a complementary manner in the cavity, with the upper face 71A of this base body bearing axially against the bottom wall 14. The gasket 8 is pushed into the downward outlet of the cavity 13, applying its lips 84 there sealably: the flow of the fluid circulating in the body of the ease 11 is thus stopped, simultaneously, with regard to the inside of the piston 42, the free volumes $V_7$ of the base 7 and the bottom of the cavity 13, connected to the outside by the ports 91.

When the thermostatic valve is in use, the base 7 is pressed against the bottom wall 14 of the cavity 13 under the action of the thermostatic element 4 and the return spring 5: the corresponding axial strains are transmitted, on one hand, from the piston 42 to the base body 71 through the upper face 47A of the bent wall 47, and, on the other hand, from the base body 71 to the bottom wall 14, through the upper face 71A of this base body. The significant radial dimensions of the two aforementioned faces 47A and 71A guarantee a reliable transmission of stress, without damaging the base body 71.

Furthermore, it is understood that the total axial dimension Δ of the heating cartridge, between the lower end of the piston 42 and the upper face 71A of the base 7, as indicated in FIG. 3, is directly dependent on the tool dimension of the overmolding mold, associated with a corresponding stop provided on the end of the heating cartridge 1. However, the dimension A is a determining factor for the thermostatic element 4 and the return spring 5 to operate in a range of predetermined axial strains in relation to the case 1. Owing to the fact that the base 7 is overmolded, the dimension Δ is controlled without having to integrate additional adjustment systems into the thermostatic valve, such as systems through screwing, added wedges, etc. Moreover, inasmuch as the injection mold M is closed on the gasket 8, dispersions of the dimension Δ, typically in the vicinity of ±0.5 mm, can be accommodated by the gasket, more precisely by axial compression of the gasket.

With an adjustment of the axial dimension of the base 7 during molding thereof, the heating cartridge can be manufactured precisely with different dimensions Δ, while also guaranteeing good mechanical strength of said base, and with a low manufacturing cost.

Various arrangements and variations of the heating cartridge and thermostatic valve described above can also be considered. For example:

the base 7 can be attached by overmolding in the flared free end 45 of the piston 42, without insertion of a partially coated gasket, such as the gasket 8; in that case, the sealing of the heating cartridge can be obtained by a gasket attached after molding of the base, placed around the latter part; and/or in the embodiment considered in the figures, the tube of the heating cartridge, in which the heating resistor 6 is arranged, constitutes the piston 42 of the thermostatic element 4; for other construction geometries of thermostatic valves, this tube of the heating cartridge and the piston of the thermostatic element, whereof the thermo-expandable substance is heated by the heating resistor belonging to the cartridge, can consist of two distinct pieces; in that case, generally, the tube of the heating cartridge extends through the bottom of the cup of the thermostatic element, opposite the piston of that element.

The invention claimed is:

1. A heating cartridge for a thermostatic element, comprising:
 a thermally conductive tube, having a longitudinal central axis and adapted to be immersed in a thermo-expandable substance of the thermostatic element,
 electric heating means arranged inside the tube, and
 a base made of a plastic substance, integral with an upper terminal portion of the tube and adapted to support the electric connection between the electric heating means and an external current source,
wherein the upper terminal portion of the tube includes an outwardly flared free end, which extends protruding both radially and axially from another portion of the upper terminal portion and in which the base is attached by overmolding.

2. The cartridge according to claim 1, wherein the base extends axially from a single axial side of the terminal portion.

3. The cartridge according to claim 1, wherein the cartridge also includes a gasket which simultaneously surrounds the flared free end and is inserted between the flared free end and the base.

4. The cartridge according to claim 3, wherein only one gasket is provided.

5. The heating cartridge according to claim 1, wherein the flared free end includes an annular flange, centered on the axis of the tube, and a bent wall transversely connecting the flange to the another portion of the upper terminal portion.

6. The heating cartridge according to claim 5, wherein the cartridge also includes a gasket which simultaneously surrounds the flared free end and is inserted between the flared free end and the base, and wherein the gasket includes an annular body defining a groove configured to receive the flange in a complementary manner.

7. The heating cartridge according to claim 5, wherein the bent wall is at least partially inscribed in a plane perpendicular to the axis of the tube.

8. A thermostatic valve, comprising:
 a heating cartridge according to claim 1,
 a case, in which a fluid circulates and which inwardly defines a blind cavity in which the base of the heating cartridge is housed and bears axially,
 a plug for regulating the flow of fluid through the case, and
 the thermostatic element including a fixed portion, fixedly connected to the case, and a mobile portion, which supports the plug and which can be moved in relation to the fixed portion under the action of expansion of a thermo-expandable substance in which the tube of the heating cartridge is immersed.

9. A method for manufacturing a heating cartridge for a thermostatic element which has a thermally conductive tube having a longitudinal central axis, and which tube is adapted to be immersed in a thermo-expandable substance of the thermostatic element and in which electric heating means are arranged, the method comprising the steps of:
 forming a free end of an upper terminal portion of the tube to flare the free end outward so that the free end extends protruding both radially and axially from another portion of the terminal portion, thereafter connecting a base made of a plastic substance to the upper terminal portion by overmolding the flared free end, and thereafter preparing the base to support an electric connection between the heating means and an external current source.

10. The method according to claim 9, wherein, before the step of attaching the base, attaching a gasket around the flared free end, then the base is overmolded while partially coating the gasket to retain it between the base and the flared free end.

11. The method according to claim 10, wherein, to overmold the base, a plastic substance is injected into a mold closed on the gasket.

* * * * *